United States Patent [19]
Repella

[11] Patent Number: 4,580,964
[45] Date of Patent: Apr. 8, 1986

[54] PRESS LOADING APPARATUS
[75] Inventor: James A. Repella, Berkley, Mich.
[73] Assignee: Microdot Inc., Darien, Conn.
[21] Appl. No.: 634,606
[22] Filed: Jul. 26, 1984
[51] Int. Cl.⁴ .............................................. B29C 31/08
[52] U.S. Cl. .................................... 425/124; 414/225;
414/751; 425/126 R; 425/338; 425/397
[58] Field of Search ........... 425/112, 124, 125, 126 R,
425/128, 383, 394, 397, 398, 400, 338, 403.1,
145, 110; 414/225, 729, 736, 751; 294/88, 99 R

[56] References Cited
U.S. PATENT DOCUMENTS

| | | | |
|---|---|---|---|
| 2,239,248 | 4/1941 | Rieser | 425/124 |
| 3,456,814 | 7/1969 | Bautz | 414/751 |
| 4,089,203 | 5/1978 | Wallis | 414/751 |
| 4,124,242 | 11/1978 | Canner | 425/403.1 |
| 4,462,781 | 7/1984 | Alieri | 425/145 |

Primary Examiner—Jay H. Woo
Assistant Examiner—J. Fortenberry
Attorney, Agent, or Firm—Lyman R. Lyon

[57] ABSTRACT

A method and apparatus for loading an array of articles into a front loading molding press. Two pairs of rails and two carriages are utilized to facilitate the various loading movements. The first or lower pair of rails is fixed and slidably mounts the first or lower carriage. The second or upper pair of rails is defined on the lower carriage and slidably mounts the upper carriage. A loading board is carried on the upper carriage and is mounted for up and down movement relative to the upper carriage. A predetermined array of loading heads are positioned on the underside of the loading board and a predetermined array of article holders are positioned between the forward portions of the lower pair of rails.

5 Claims, 7 Drawing Figures

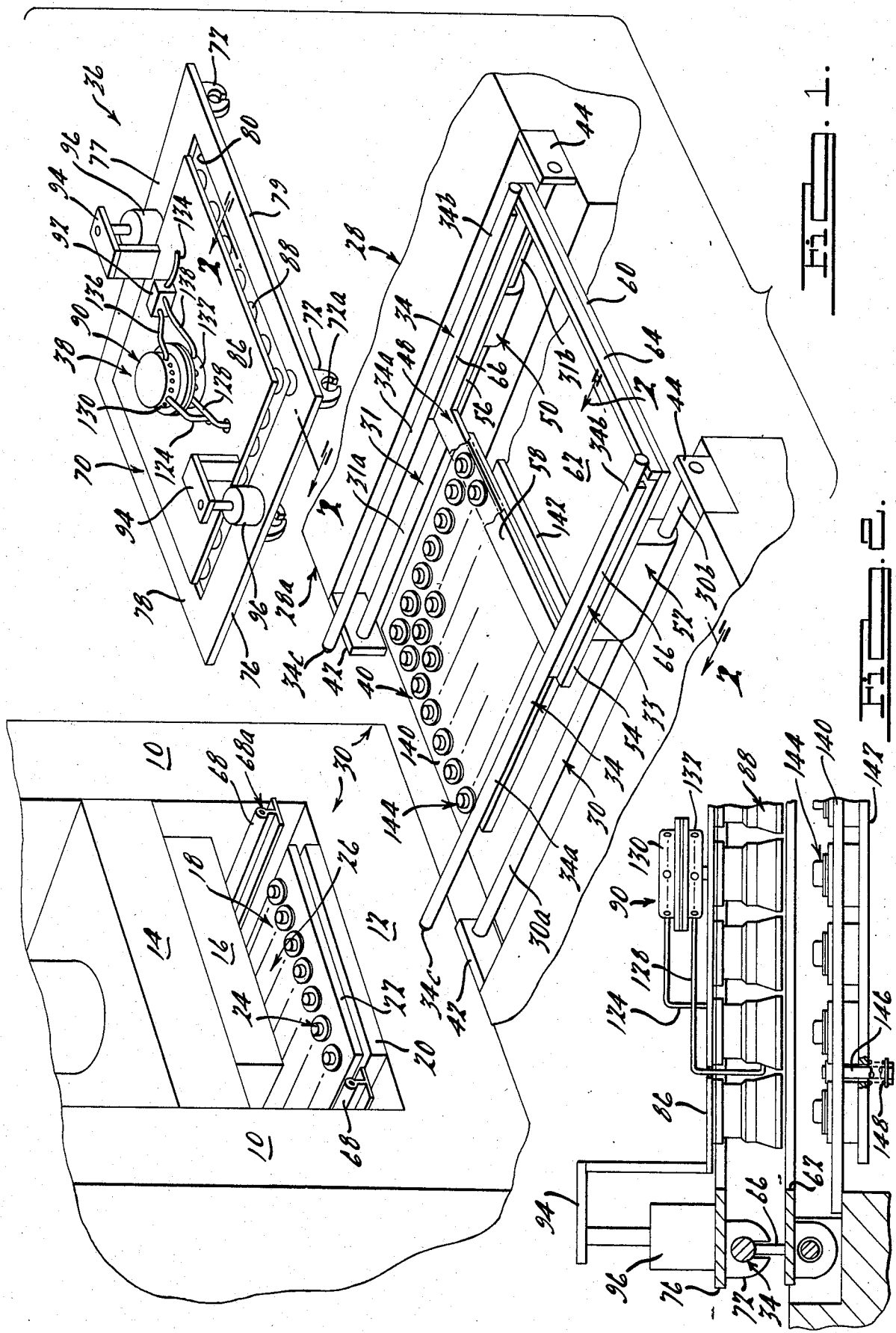

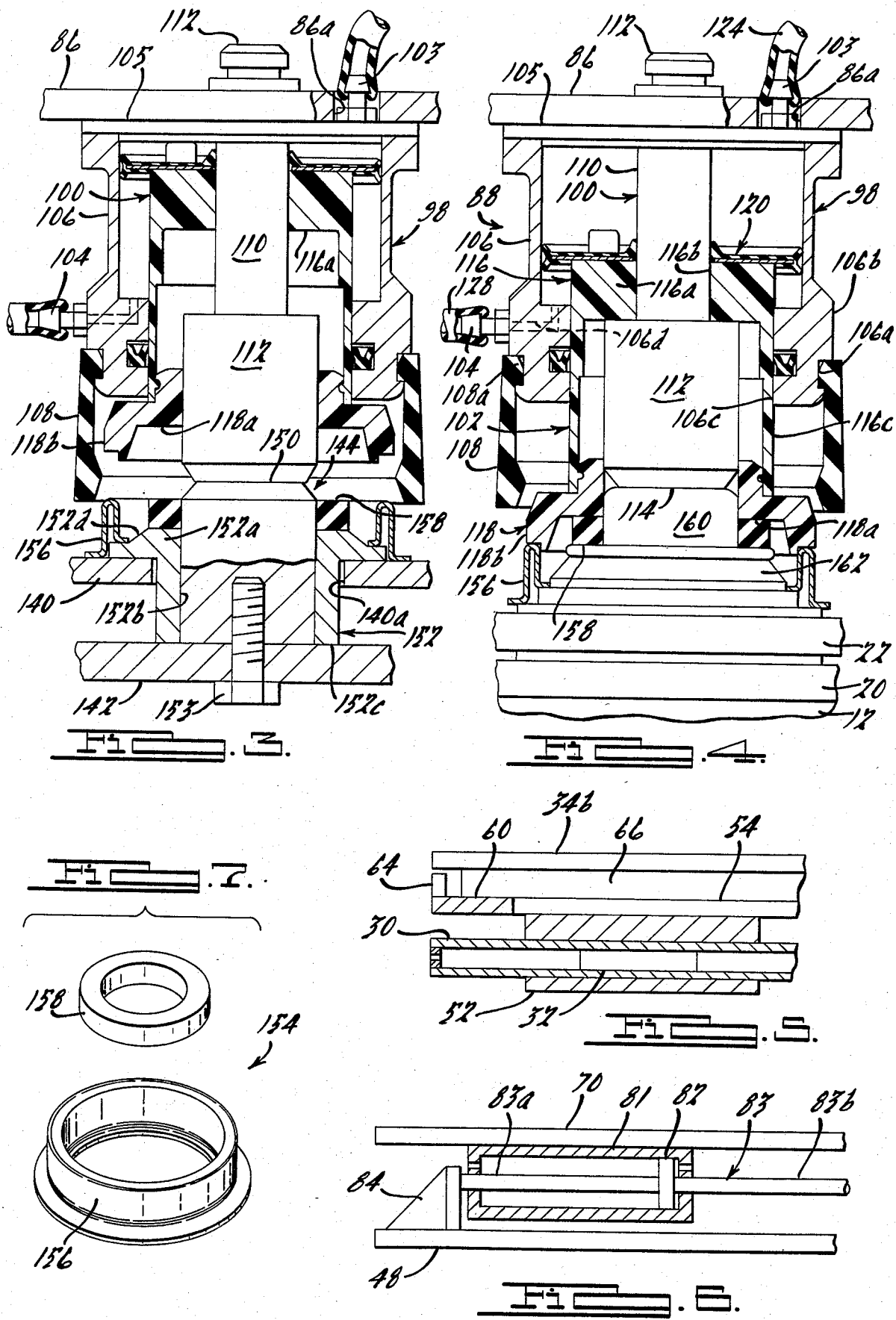

PRESS LOADING APPARATUS

BACKGROUND OF THE INVENTION

This invention relates to press loading methods and apparatus and more particularly to apparatus and methods for loading molding presses.

Molding operations are typically carried out on a high volume batch basis where the total time required to produce a given size batch of molded articles is critical from a manufacturing cost standpoint. Since the time required for the actual molding operation in the press is typically relatively fixed by the particular molding operation being performed, any significant reduction in the total manufacturing time must involve reductions in the time required to load and unload the press. This invention addresses the problem of reducing the time required to load the press. Loading of molding presses was originally done in a totally manual process wherein the press was opened and the operator placed the articles to be molded, individually and by hand, in a predetermined array on the mold. Later attempts at reducing loading time have involved the use of a preloading board or tray where the operator, while the press is closed for a molding operation, prepares a predetermined array of articles on the preloading board and then, upon opening of the press following completion of the molding operation, positions the preloading board in the press over the mold and actuates a suitable release mechanism to allow the articles to be transferred downwardly onto the mold. While this preloading system reduces loading time significantly, the loading time still remains a significant part of the total time required to produce the molded part.

SUMMARY OF THE INVENTION

It is accordingly the object of the present invention to provide an apparatus and method for loading a molding press that will minimize loading time.

According to the invention, the articles to be molded are assembled in a predetermined array at a remote preloading location; the articles are thereafter conveyed in their predetermined array to a loading location in which they are positioned in front of the press and lie in a horizontal loading plane passing above the mold in the press; the articles are thereafter moved in their predetermined array and in the horizontal loading plane into the press to a location in the press directly overlying the mold; and the articles are thereafter transferred downwardly in their predetermined array onto the mold.

According to a further feature of the invention, the preloading location is in front of the press below the loading location and the conveying step comprises raising the articles in their predetermined array from the preloading location to the loading location, whereafter they are moved in the horizontal loading plane into the press.

The loading apparatus of the invention includes a plurality of article holders arranged in a predetermined array in front of the press; a loading board; a plurality of loading heads positioned in a predetermined array on the underside of the loading board; and means mounting the loading board for successive movement between a remote preloading position, a loading position directly overlying the article holders, and an unloading position directly overlying the mold in the press.

According to a further feature of the invention, the loading board, in its movement between its preloading, loading, and unloading positions, moves linearly in a horizontal loading plane passing above the mold in the press; and the article holders and loading heads include coacting means operative in response to relative vertical movement between the loading heads and the article holders to transfer an array of articles from the article holders to the loading heads. The loading board is positioned remote from the press while the press operator loads articles into the article holders, whereafter the loading board is moved toward the press in the horizontal loading plane to a position overlying the article holders; the loading board is lowered to transfer the articles to the loading boards; and the loading board is raised back up into the horizontal loading plane and thereafter moved in the loading plane into the press to an unloading position overlying the mold in the press.

In the disclosed embodiment of the invention, two pairs of rails and two carriages are utilized to facilitate the various loading movements. The first or lower pair of rails is fixed and slidably mounts the first or lower carriage. The second or upper pair of rails is defined on the lower carriage and slidably mounts the second or upper carriage. The loading board is carried on the upper carriage and is mounted for up and down movement relative to the upper carriage. The article holders are positioned between the forward portions of the lower rails. In operation, with the lower carriage positioned on the rearward portions of the lower rails and the upper carriage positioned on the rearward portions of the upper rails, an operator loads a predetermined array of articles into the article holder. The lower carriage is then slid forwardly toward the press on the lower rails to position the loading board over the article holders and move the leading ends of the upper rails into seating engagement with the respective of ends of rails provided in the press at opposite sides of the mold to provide continuous rails extending into the press, whereafter the loading board is lowered to bring the loading heads into coaction with the article holders and transfer the articles to the loading heads. The loading board is then raised and the upper carriage is moved forwardly into the press on the forward portions of the upper rails and on the coacting rails provided in the press. Once positioned in the press over the mold, suitable ejector means in the loading heads are actuated to transfer the articles downwardly onto the mold, whereafter the upper carriage is withdrawn from the press and the press is closed to perform the molding operation.

BRIEF DESCRIPTION OF THE DRAWINGS

FIG. 1 is a schematic, exploded, fragmentary view of a loading apparatus according to the invention shown in conjunction with a molding press;

FIG. 2 is a cross-sectional view taken on line 2—2 of FIG. 1;

FIG. 3 is a cross-sectional view of a loading head used in the invention loading apparatus, shown in conjunction with an article holder according to the invention;

FIG. 4 is a cross-sectional view similar to FIG. 3 but showing a loading head in conjunction with a mold subassembly;

FIGS. 5 and 6 are cross-sectional, somewhat schematic views of actuating mechanisms employed in the invention loading apparatus; and FIG. 7 is a perspective view of an article assembly of the type for which the invention loading apparatus is particularly suitable.

DETAILED DESCRIPTION OF THE PREFERRED EMBODIMENT

The invention loading apparatus is seen in FIG. 1 in conjunction with a front loading, down acting molding press of the type including sides 10, a bolster 12, a crown 14, a platen 16, and a mold 18. Platen 16 is shown in its raised position and is movable downwardly to a position directly overlying mold 18 where it coacts with mold 18 to perform a molding operation. Mold 18 is supported on bolster 12 and includes a fixed bottom plate 20, a stripper plate 22, and a predetermined array of mold subassemblies 24 mounted on bottom plate 20 and projecting upwardly for passage through suitable apertures in stripper plate 22. A through press opening 26 is defined between sides 10, the bottom of platen 16 and the top of mold 18.

The invention press loading apparatus includes a frame structure 28; a pair of first or lower rails 30, 31; a first or lower carriage 33; a pair of second or upper rails 34; a second or upper carriage 36; a loading board 38; and a preloading board 40.

Frame structure 28 is positioned in front of press opening 26 with a space 30 between the front face of the press and the confronting front face 28a of the frame structure to allow access and passage by a press operator. Lower rails 30, 31 are fixedly mounted between forward and rearward brackets 42, 44 carried by frame structure 28. Rails 30, 31 are parallel and extend generally normal to the front face of the press at opposite sides of press opening 26. Rails 30, 31 have a circular cross section and include forward portions 30a, 31a and rearward portions 30b, 31b. Rail 30 is hollow and includes a piston 32 (FIG. 5) formed as a cylindrical magnet mounted slidably within hollow rail 30.

Lower carriage 33 includes a plate 48 and yokes 50 and 52. Plate 48 includes longitudinal portions 54, 56 and transverse portions 58, 60 defining a central rectangular opening 62. Yoke 50 is secured to the underside of plate portion 56 and is slidably mounted on rail 31. Yoke 52 is secured to the underside of plate portion 54 and is slidably mounted on rail 30. Yoke 52 is formed of a magnetic material so that as piston magnet 32 is moved slidably within hollow rail 30 by pressurized air admitted to either end of rail 30, yoke 52 will follow the piston movement to thereby move lower carriage 33 slidably on rails 30, 31. A pickup bar 64 extends transversely across the rear edge of plate portion 60.

Upper rails 34 are secured to the upper edge of bars 66 which in turn are secured to the upper face of carriage plate portions 54, 56. Rails 34 have a circular cross section and include forward portions 34a and rearward portions 34b. The forward ends 34c of rails 34 are rounded for seating coaction with the concave ends 68a of rails 68 fixedly secured in press opening 26 at opposite sides of mold 18.

Upper carriage 36 includes a plate 70 and bearing brackets 72. Plate 70 includes longitudinal portions 76, 77 and transverse portions 78, 79 defining a central rectangular opening 80. Bearing brackets 72 are secured to the underside of plate 70 and mount upper carriage 36 for sliding movement along rails 34. Each bracket 72 is split at 72a to allow passage of the associated bar 66 as the carriage moves slidably along the rearward portions 34b of rails 34. Upper carriage 36 is moved slidably along rails 34 by an air cylinder 81 (FIG. 6) suitably secured to the underside of upper carriage plate 70 and including a piston 82 and a double ended piston rod 83 passing slidably through central apertures in the opposite end walls of the air cylinder. Rod 83 includes an end portion 83a coacting with a pushoff bracket 84 on lower carrier plate 48 to propel carriage 36 toward the press and another end portion 83b coacting with a pushoff bracket in the press (not shown) to propel the carriage away from or out of the press.

Loading board 38 is carried by upper carriage 36 and includes a loading plate 86, a plurality of loading heads 88, an air manifold 90, and a control valve 92.

Loading plate 86 is of a size and configuration to pass readily through carriage plate openings 80 and 62 and is mounted for up and down movement relative to carriage plate 70 by brackets 94 coacting with air cylinders 96 mounted on the upper face of plate portions 76 and 77.

Loading heads 88 are secured to the underside of plate 86 in a predetermined array. For example, forty-nine loading heads may be provided arranged in seven rows of seven across. With air cylinders 96 in their extended positions as seen in FIGS. 1 and 2, the lower ends of loading heads 88 are disposed in a horizontal loading plane passing immediately over press mold 18.

Each loading head 88 includes a cylindrical housing assembly 98, a post assembly 100, a piston assembly 102, and fittings 103, 104.

Housing assembly 98 includes a metallic mounting plate 105 suitably secured to the underside of plate 86; a metallic cylindrical casing 106 suitably secured at its upper end to plate 105; and an elastomeric retainer ring 108 mounted on the lower annular end of casing 106 by snapping coaction between retainer ring inner lip 108a and an external annular groove 106a formed in a thickened lower portion 106b of casing 106.

Post assembly 100 includes an upper metallic post member 110 positioned coaxially within housing assembly 98 by a screw 112 passing through apertures in plate 80 and plate 105 for threaded engagement with member 110, and a lower post member 112 of polyethylene or the like secured to the lower end of member 110 by a screw 114.

Piston assembly 102 constitutes an unloading device for the loading head and includes a cup-shaped piston 116, an ejector member 118, and a seal 120.

Piston 116 is preferably formed of a rigid plastic material such as nylon and includes a base portion 116a having a central aperture 116b passing upper post member 110 and a cylindrical side wall portion 116c sealingly and slidably engaging the radially inner periphery 106c of thickened casing portion 106b.

Ejector member 118 may be formed of polyethylene. Ejector member 118 includes a radially inner annular portion 118a slidably mounted on lower post 112 and including an external groove snappingly coacting with an internal rib adjacent the lower end of piston side wall portion 116c to mount the ejector member coaxially on the lower end of piston 116. Ejector member 118 further includes a radially outer annular portion 118b positioned coaxially within retainer ring 108.

Seal 120 is secured to the upper face of piston base porion 116a and sealingly coacts at its radially inner periphery with upper post 110 and at its radially outer periphery with the inner periphery of casing 106.

Fitting 103 is secured to mounting plate 105 through an aperture 86a in plate 86 to allow pressurized air supplied through an air hose 124 to be admitted to the annular space above seal 120 to move piston assembly 102 downwardly on post assembly 100; and fitting 104 is secured to the side wall of casing 106 to allow pressurized air supplied through an air hose 128 to be directed through a casing passage 106d and into the annular space below seal 120 to move piston assembly 102 upwardly on post assembly 100. Pressurized air is directed to fittings 103, 104 of each loading head by an air supply system including air manifold 90 and air valve 92.

Air manifold 90 is secured centrally to the upper face of loading plate 86 and includes an upper manifold section 130 having a plurality of circumferentially spaced fittings communicating with respective air hoses 124, and a lower manifold section 132 having a plurality of circumferentially spaced fittings communicating with respective air hoses 128.

Air valve 92 is secured to the upper face of loading plate 86 and communicates with a source of pressurized air (not shown) through an inlet hose 134. Valve 92 includes two outlet lines 136 and 138 respectively communicating with manifold sections 130 and 132 to respectively supply air under pressure to hoses 124 and 128.

Preloading board 40 includes an upper plate 140, a lower plate 142, and a plurality of article holders 144.

Upper plate 140 is suitably supported in a horizontal position on the forward portion of frame structure 28 directly in front of press opening 26 and at a height approximating the height of mold stripper plate 22. A plurality of circular apertures 140a are provided in plate 140 for respective receipt of article holders 144.

Lower plate 142 is positioned directly beneath upper plate 140 and is spring mounted to upper plate 140 by a series of bolts 146 passing through apertures in plates 140 and 142 and coacting with coil springs 148 encircling bolts 146 beneath plate 142.

Article holders 144 are arranged in a predetermined array on preloading board 40 corresponding to the predetermined array of loading heads on loading board 38. Each article holder includes a central circular post member 150 and an annular base member 152. Central post member 150 extends upwardly from lower plate 142 for central passage through a respective upper plate aperture 140a and is secured to lower plate 142 by a bolt 153. Base member 152 includes an upper flange portion 152a and a cylindrical side wall portion 152b. Base member 152 is positioned in aperture 140a with the inner periphery of wall portion 152b slidably encircling post 150, the outer periphery of wall portion 152 passing slidably through aperture 140a, and flange portion 152a seated on plate 140 around aperture 140a. The lower annular edge 152c of base member 152 seats on lower plate 142.

OPERATION

Although the invention loading method and apparatus are suitable for use with a wide variety of articles to be molded, the specific apparatus disclosed is intended for use with an article assembly 154, as seen in FIG. 7, comprising an outer metallic ring 156 and an inner elastomeric ring 158 which will be joined in the molding operation to form an annular seal.

During the time that a series of articles is being molded in the molding press, an operator, standing in front of the closed press in space 30, preloads a new array of articles onto article holders 144 with lower carriage 33 disposed in its preloading or retracted position as seen in FIG. 1 and upper carriage 36 disposed in its preloading or retracted position directly overlying the lower carriage. Specifically, to perform the preloading operation, the operator presses a plurality of elastomeric rings 158 onto respective posts 150 and places a plurality of metal rings 156 concentrically around the elastomeric rings with the inner periphery of each ring seating on a scalloped upper seat 152d defined on each base member flange portion 152a. The loaded elastomeric rings seat on the upper annular face of base member flange portions 152a and are frictionally retained on post 150.

As soon as the molding operation is completed in the press, platen 106 raises automatically, stripper plate 22 is raised automatically to strip the molded annular seals from the mold subassemblies 24, and air is automatically blown across stripper plate 22 to blowingly discharge the molded seals out of the open rear face of the press into a suitable collection facility. The operator, from a position removed from space 30, now actuates a suitable control mechanism to initiate a loading cycle whereby the article assemblies preloaded onto preloading board 40 will be quickly and automatically loaded into the press.

Specifically, air is admitted to the rear end of hollow rail 30 to move lower carriage 33 forwardly from its retracted or preloading position on rearward rail portions 30b, 31b to its loading position on forward rail portions 30a, 31a. As lower carriage 33 moves into its loading position, the leading convex ends 34c of upper rails 34 seat in the concave ends 68a of press rails 68 to form continuous rails extending into the press at opposite sides of the press mold, and upper carriage 36 is moved forwardly on lower carriage 33 in the horizontal loading plane to a position in which loading heads 88 on the underside of loading plate 70 respectively and directly overlie article holders 144 on preloading board 40. Air cylinders 96 are now retracted to lower loading board 70 and bring loading heads 88 into engagement with article holders 144.

As seen in FIG. 3, as the rigid central post 112 of each loading head 88 contacts the respective article holder post 150, post 150 and lower plate 142 move downwardly under the resistance of springs 148 to strip elastomeric rings 158 from article holder post 150 and transfer them to loading head post 112. Downward movement of the loading heads over the article holders also serves to frictionally insert metal rings 156 into resilient retainer rings 118. The preloaded article assemblies have now been transferred to the loading heads. Air cylinders 96 are now extended to return loading board 74 to its raised position in which the lower ends of the loading heads and the articles carried thereby are in the horizontal loading plane. As soon as the loading board has returned to its raised position, air cylinder 81 is actuated by admission of pressurized air to the right side of piston 82 as seen in FIG. 6. This causes rod 83 to push off from bracket 84 and propel the upper carriage forwardly into the press along coacting rails 34 and 68 to an unloading position in which loading heads 88 respectively overlie mold subassemblies 24.

As the upper carriage 36 arrives at its unloading position in the press, air cylinders 96 are retracted to lower loading board 74 onto mold 18 to respectively position loading head posts 112 on mold subassembly posts 160 whereafter, as best seen in FIG. 4, valve 92 is switched to a mode in which pressurized air is delivered to upper manifold section 90 and through hoses 124 to move piston assemblies 102 downwardly in casings 106. Downward movement of piston assemblies 102 moves ejector members 118 downwardly to cause inner ejector member portions 118a to strip elastomeric rings 158 from post 112 and cause outer ejector member portions 118b to dislodge metal rings 156 from retainer rings 108. As the elastomeric and metal rings are discharged downwardly, the elastomeric rings are frictionally mounted on the central post 160 of the mold subassemblies 24 and the metal rings are deposited onto base portions 162 of the mold subassemblies. The downward movement of piston assemblies 102 is limited by abutting engagement of piston base portions 116a with the shoulders formed at the juncture of post members 100 and 112.

Valve 92 is now switched to a mode in which pressurized air is delivered through manifold section 132 and hoses 128 to the underside of piston seals 120 to return piston assemblies 102 to their retracted positions (as seen in FIG. 3), whereafter air cylinders 96 are extended to return loading board 74 to its raised position. Cylinder 81 is now actuated by admission of pressurized air to the left end of the cylinder (as seen in FIG. 6) to cause piston rod 83b to kick off from the pushoff bracket in the press and propel upper carriage 36 rearwardly out of the press along coacting rails 34, 68. As upper carriage 36 reaches a position overlying preloading board 40, slide brackets 72 engage pickup plate 64 on the lower carriage so that the carriages now move together along rails 30, 31 toward their retracted or preloading positions of FIG. 1. As the coupled carriages approach their retracted or preloading positions, air is admitted to the right end (as seen in FIG. 5) of hollow rail 30 to actuate piston magnet 32 and insure that the coupled carriages return firmly and positively to their preloading positions. As soon as the upper carriage is ejected from the press, the press is closed to begin a new molding operation and, as soon as the carriages return to their preloading positions, the press operator may re-enter space 30 and preload a new array of articles onto preloading board 40 preparatory to the next loading and molding operation.

The described method and apparatus have been found to reduce press loading time substantially while not in any way derogating from the quality of the actual molding operation.

Whereas a preferred embodiment of the invention has been illustrated and described in detail, it will be apparent that various changes may be made in the disclosed embodiment without departing from the scope or spirit of the invention. For example, whereas the transfer of articles from preloading board 40 to loading heads 88 is accomplished in the disclosed embodiment by the use of a powered loading heads and passive article holders, it may be necessary for certain article assembly applications to also power the article holders so that the preloaded articles are forced upwardly under power into the loading heads.

I claim:

1. An apparatus for loading a plurality of annular articles into a front loading molding press comprising:
    A. a plurality of article holders arranged in a predetermined horizontal array in front of the press;
    B. a loading board;
    C. a plurality of loading heads positioned in a predetermined array on the underside of said loading board;
    D. means mounting said loading board for successive movement between
        (1) a remote, preloading position;
        (2) a loading position directly overlying said article holders; and
        (3) an unloading position directly overlying the mold in the press;
    E. said loading board being movable between its preloading, loading, and unloading positions in a horizontal loading plane passing above the mold in the press;
    F. said article holders being positioned beneath said horizontal loading plane;
    G. said loading heads and article holders including coacting means operative in response to relative vertical movement between said loading heads and said article holders to transfer an array of articles preloaded into said article holders upwardly to said loading heads;
    H. said coacting means for each loading head comprising a rigid post extending downwardly from said loading board and sized to frictionally receive an annular article therearound; and
    I. said coacting means being mounted for resilient vertical yielding movement in response to engagement by the lower end of a rigid post of a respective loading head to transfer an annular article from the upstanding post of the article holder to the downwardly extending post of the loading head in response to relative vertical movement between the loading head and the article holder.

2. An apparatus according to claim 1 wherein:
    J. said relative vertical movement comprises downward movement of said loading board and said loading heads carried thereby to engage the rigid downwardly extending posts of the loading heads with the resilient upstanding posts of the article holders and resiliently depress the article holder posts to transfer the preloaded array of articles from the article holders to the loading heads.

3. An apparatus according to claim 2 wherein said article is an assembly and includes and outer metal ring and an inner elastomeric ring and wherein:
    K. the yieldable post of each article holder is sized to frictionally receive the inner elastomeric ring;
    L. each article holder further includes an annular base portion positioned around the yieldable post and adapted to position the outer metal ring concentrically around the inner elastomeric ring; and
    M. each loading head further includes a resilient retainer ring positioned concentrically around the post of the respective loading head and sized to frictionally receive an outer metal ring therewithin, whereby, upon downward movement of said loading board, said resilient posts of said article holders are depressed by said rigid posts of said loading heads to transfer said inner elastomeric rings to said loading head posts and said retainer rings frictionally receive the outer metal rings therewithin.

4. An apparatus for loading a plurality of articles into a front loading molding press, each of said articles comprising an assembly including an outer metal ring adapted to be frictionally held within a retainer ring and an inner elastomeric ring joined to the outer metal ring to form an annular seal, said apparatus comprising:
    A. a frame structure adapted to be positioned in front of the press with a space between the front face of the press and the confronting front face of the frame structure to allow access by an operator;

B. a plurality of article holders arranged in a predetermined horizontal array on the forward portion of said frame structure in front of the press opening;

C. a first pair of parallel rails fixedly mounted on said frame structure extending generally normal to the front face of the press and including forward portions disposed at opposite sides of said article holder array and rearward portions extending generally to the rear face of the frame structure;

D. a first carriage mounted for selective sliding movement on said first pair of rails between a preloading position in which it is positioned on the rearward portions of said first pair of rails and a loading position in which it is slid forwardly to a position on the forward portions of said first set of rails;

E. a second pair of rails defined on said first carriage parallel to and above said first pair of rails and including rearward portions positioned generally over the rearward portion of said first pair of rails with said first carriage in its preloading position, and forward portions disposed on opposite sides of said article holder array generally above said forward positions of said first pair of rails with said first carriage in its preloading position;

F. a second carriage mounted for sliding movement on said second pair of rails between a preloading position in which it is positioned on the rearward portions of said second pair of rails and a loading position in which it is positioned on the forward portions of said second pair of rails;

G. a loading board carried by said second carriage;

H. a plurality of loading heads mounted on the underside of said loading board;

I. means on said second carriage for moving said loading board up and down relative to said second carriage;

J. coacting means on said article holders and on said loading heads operative in response to relative vertical movement between said loading heads and said article holders to transfer an array of articles preloaded into said article holders upwardly to said loading heads, whereby, with said first carriage positioned on said rearward portions of said first pair of rails and said second carriage positioned on said rearward portions of said second pair of rails, an operator, positioned in the space between the front face of the press and the front face of the frame structure, may load a plurality of articles into said article holders, whereafter said first carriage may be slid forwardly to a loading position on the forward portions of said first pair of rails to bring said loading board on said second carriage into a position overlying said article holders and move the forward portions of said second pair of rails into positions where said second pair of rails span said space and the leading ends thereof engage the ends of rails positioned in the press at opposite sides of the mold in the press to define continuous rails extending across said space and into the press, whereafter said loading board may be lowered to allow said coacting means to transfer the articles from said article holders to said loading heads, whereafter said loading board may be raised and said second carriage may be slid forwardly on said continuous rails to a position in the press overlying the mold where the articles may be discharged downwardly onto the mold;

K. each of said loading head including
   (1) a cylindrical housing assembly having an upper end mounted to the underside of said loading board and including a resilient retainer ring positioned at the free lower end of said housing assembly adapted to frictionally receive and hold an article therewithin; and
   (2) ejector means positioned within said cylindrical housing and operative when actuated to discharge an article frictionally held by said retainer ring;

L. each of said loading heads further including a central post positioned coaxially within said housing assembly and having a free lower end positioned concentrically within said retainer ring of a diameter to frictionally pass and grasp the elastomeric ring of an article assembly; and M. said ejector means comprising an annular piston assembly slidably mounted on said post and operative upon downward sliding movement to dislodge the elastomeric ring from said post and the metal ring from said retainer ring.

5. An apparatus according to claim 4 wherein:

N. said piston assembly includes
   (1) a cup-shaped piston having a central aperture in its base slidably passing said post, and
   (2) an annular ejector member secured to the lower annular end of the cylindrical side wall of said piston and including an annular inner portion guiding on the free lower end of said post and adapted to engage and dislodge the elastomeric ring and an annular outer portion adapted to engage and dislodge the metal ring.

* * * * *